United States Patent [19]

Nakamura

[11] Patent Number: 4,782,454

[45] Date of Patent: Nov. 1, 1988

[54] COMBINATION WEIGHING DEVICE

[75] Inventor: Sadao Nakamura, Kobe, Japan

[73] Assignee: Yamato Scale Company, Limited, Japan

[21] Appl. No.: 901,317

[22] Filed: Aug. 28, 1986

[30] Foreign Application Priority Data

Dec. 5, 1985 [JP] Japan .................................. 60-274798

[51] Int. Cl.⁴ ..................... G01G 17/00; G01G 19/22; G01G 19/34
[52] U.S. Cl. ........................................ 364/567; 177/25
[58] Field of Search ..................... 364/567; 177/63–66, 177/25.18

[56] References Cited

U.S. PATENT DOCUMENTS

| | | | |
|---|---|---|---|
| 4,300,201 | 11/1981 | Wochnowski | 364/567 |
| 4,336,853 | 6/1982 | Hirano | 364/567 |
| 4,421,185 | 12/1983 | Koto et al. | 177/25.18 |
| 4,466,499 | 8/1984 | Minamida et al. | 364/567 |
| 4,534,428 | 8/1985 | Mosher et al. | 177/64 |
| 4,548,286 | 10/1985 | Sashiki et al. | 177/1 |
| 4,581,704 | 4/1986 | Mitsukawa | 364/567 |

FOREIGN PATENT DOCUMENTS 59-46821 3/1984 Japan .

Primary Examiner—Parshotam S. Lall
Assistant Examiner—Steven A. Melnick
Attorney, Agent, or Firm—Senniger, Powers, Leavitt and Roedel

[57] ABSTRACT

A combination weighing device having a plurality of weighing units for weighing out batches of product successively by combining the contents of some of the weighing units which are selected as suitable, each batch, which is weighed out, having a volume controlled to fall within a predetermined range, as well as a weight satisfying a predetermined condition.

12 Claims, 2 Drawing Sheets

COMBINATION WEIGHING DEVICE

This invention relates to a combination weighing device for weighing out batches of product, each having an acceptable volume, as well as an acceptable weight.

BACKGROUND OF INVENTION

A combination weighing and packing device of this type is disclosed, for example, in the opened Japanese patent specification No. 59-46821. The weighing section of this device delivers batches of product, such as cornflakes, each batch having a degree of swell which may vary according to manufacturing conditions. Thus the apparent specific gravity of the batches may vary significantly. In the packing section, each batch is introduced into a transparent cylinder and a wrapping film is also introduced therein to wrap the batch by closing the top and bottom ends thereof. The transparent cylinder is provided with photoelectric detectors each comprising light-emitting and sensing elements for detecting the height of wrapped product representative of the volume of product. The detected height is used for controlling the acceptable weight in the next cycle of combination selecting operation.

In the above-cited device, the photoelectric detectors are disposed in the packing section and tend to undesirably complicate its structure together with its sophisticated packing mechanism. Another disadvantage of such photoelectric detectors is that it is difficult to interface weighing and packing devices of this type designed and manufactured separately by different vendors (as is usually the case), since the outputs of the photoelectric detectors are to be fed back from the packing device to the weighing device for controlling the target weight.

Accordingly, an object of this invention is to provide a combination weighing device which is equipped to detect the volume of product selected in each combination to control the target weight.

SUMMARY OF INVENTION

This object can be attained by a combination weighing device according to this invention, which includes a collection chute for collecting selected batches of product, a retaining hopper for receiving the collected product from the collection chute and retaining it temporarily, and means for detecting the volume of product in the retaining hopper.

The invention will be described in more detail below in conjunction with its preferred embodiments with reference to the accompanying drawings.

BRIEF DESCRIPTION OF DRAWINGS

In the drawings.

Throughout the drawings, the same reference numerals are given to same or similar structural components.

DESCRIPTION OF PREFERRED EMBODIMENTS

Figure 1:
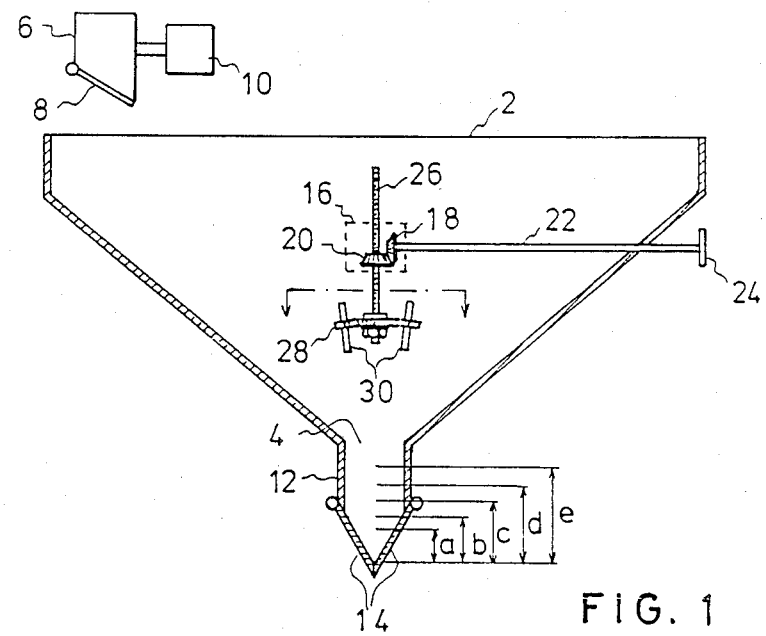
FIG. 1 is a schematic sectional side view showing an essential part of the combination weighing device according to this invention.

As shown in the above-cited reference, the inventive combination weighing device includes a funnel-like collection chute 2 having a bottom opening 4 as shown in FIG. 1. A plurality of weighing hoppers 6 (only one is shown for simplification) each having a normally-closed discharge gate 8 are arranged circularly above the collection chute 2 around its periphery. A weight sensor 10, such as load cell, is coupled to each weighing hopper 6 for measuring the weight of product fed into the hopper. Though not shown in the drawing, a product feeding arrangement including, for example, a central dispersion table, radial conveying troughs and corresponding pool hoppers may be located above the weighing hoppers for feeding about a predetermined amount of product to each emptied weighing hopper, as in conventional combination weighing devices.

As a feature of this invention, the bottom opening 4 of the collection chute 2 is connected to a retaining hopper 12 having a pair of discharge gates 14 of French-door type for retaining the collected product temporarily before delivery to an associated packing machine (not shown).

In the center of the collection chute 2, a gear box 16 (outlined in phantom) is fixed to the chute 2 by suitable supporting brackets (not shown) and contains two meshing bevel gears 18 and 20.

Figure 2:
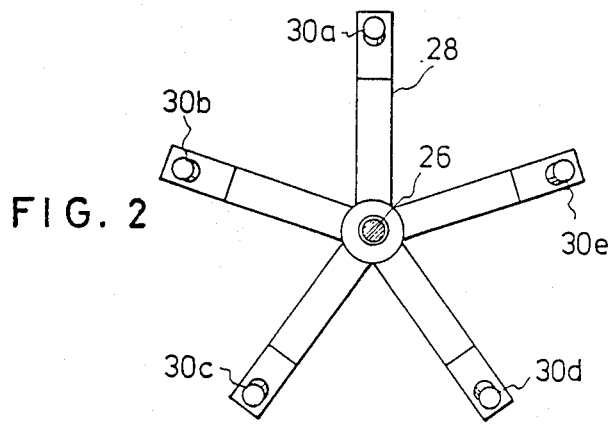
FIG. 2 is an enlarged plan view representing an example of photoelectric detector structure used in the device as shown in FIG. 1.
Figure 3:
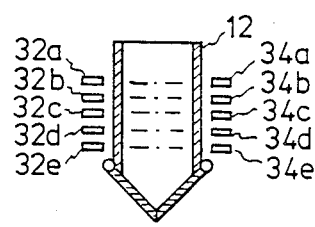
FIG. 3 is a schematic side view representing an alternative example of photoelectric detector arrangement usable in the device as shown in FIG. 1.

The bevel gear 18 is fixed to one end of an actuating shaft 22 having a handle 24 at the other end, for rotating the bevel gear 20 about a fixed vertical axis. The bevel gear 20 has a threaded center hole meshing with a threaded shaft 26 which is movable vertically but which is not rotatable, so that manual rotation of the handle 24 results in vertical movement of the threaded shaft 26. As shown more clearly in FIG. 2, five radial arms 28 extend radially outwardly from the lower end of the shaft 26 and support photoelectric detection probes 30a, 30b, 30c, 30d and 30e, respectively, at their distal (outer) ends. Each detection probe is of the reflection type containing both light emitting and sensing elements as is well known in the art. The detection probes 30a, 30b, 30c, 30d and 30e are fixed to respective arms 28 at specific angles relative to the vertical direction. The angles of these probes and positions their vertical position are selected so that they can detect the product in the retaining hopper 12 exceeding predetermined levels a, b, c, d and 3, respectively, measured from the bottom of hopper, as shown in FIG. 1. As an alternative to the detection probes 30a, 30b, 30c, 30d and 30e, corresponding pairs of light emitting and receiving elements 32a and 34a through 32e and 34e may be disposed on either side of the retaining hopper 12 made of transparent material at the corresponding levels, as shown in FIG. 3. No further description will be made on this detector configuration, since it will be readily understood by those skilled in the art.

Figure 4:
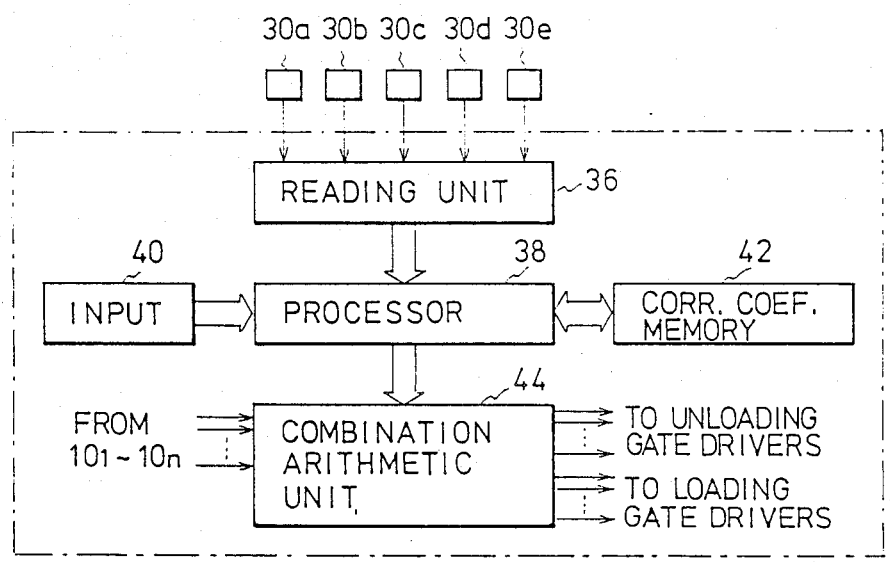
FIG. 4 is a block diagram representing an embodiment of combination weighing device according to this invention.

The output signals of the respective detection probes 30a to 30e are read in a target weight processor 38 through a reading unit 36, as shown in FIG. 4. The reading operation takes place when the batches of product discharged from selected weighing hoppers 6 are completely collected (via collection chute 2) in the retaining hopper 12. In the inventive device, the volume of product collected in the retaining hopper 12 is controlled automatically by adjusting a target weight used for combination selection, in the following manner. For convenience of description, it is now assumed that each detection probe provides a logic "1" signal when the corresponding level is exceeded and, otherwise, a logic "0" signal. Then, there will be six cases of output levels of the probes 30a, 30b, 30c, 30d and 30e, as shown in the following table.

| CASE | 30a | 30b | 30c | 30d | 30e | STATE OF LEVEL | K |
|------|-----|-----|-----|-----|-----|----------------|-----|
| 1 | 0 | 0 | 0 | 0 | 0 | H < a | K3 |
| 2 | 1 | 0 | 0 | 0 | 0 | a < H < b | K2 |
| 3 | 1 | 1 | 0 | 0 | 0 | b < H < c | K1 |
| 4 | 1 | 1 | 1 | 0 | 0 | c < H < d | 1 |
| 5 | 1 | 1 | 1 | 1 | 0 | d < H < e | k1 |
| 6 | 1 | 1 | 1 | 1 | 1 | e < H | k2 |

Here, H is the practical (actual) level of product in the retaining hopper 12 and K is the coefficient for correction of the target weight as described later.

It is further assumed, for example, that the desired packing volume of product is obtainable in Case 4 where the product level falls between the prescribed levels c and d. A target weight value W corresponding to this volume is set originally in the processor 38 through an input unit 40 such as a keyboard device. The abovementioned correction coefficient K is determined experimentally for each case about unity for Case 4, as shown in the foregoing table. In the table, the coefficients are related as follows: k2<k1<1<K1<K2<K3. These coefficients are also stored previously in a correction coefficient memory 42 in relation to the format of outputs of the probes 30a to 30e as shown in the table. In response to the format of outputs supplied from the reading unit 36, the processor 38 reads out a corresponding correction coefficient K from the memory 42 and multiplies it by the target weight value W stored previously therein. The resultant product KW, the corrected target value, is applied to a combination arithmetic unit 44 for use in combination selection. The combination arithmetic unit 44 is of a conventional type, which receives a plurality of weight signals from the weight sensors $10_1$ to $10_n$ and selects an optimum (acceptable) combination whose total weight is equal or nearest to the corrected target weight, thereby delivering command signals to unloading and loading gate drivers (not shown) for discharging the product from the selected weighing hoppers and, then, replenishing them. It will be understood from the above that the target weight value is corrected every cycle of combination selection so that the volume or level of product in the retaining hopper 12 is automatically controlled toward the desired value (corresponding to Case 4 in this example).

Figure 5:
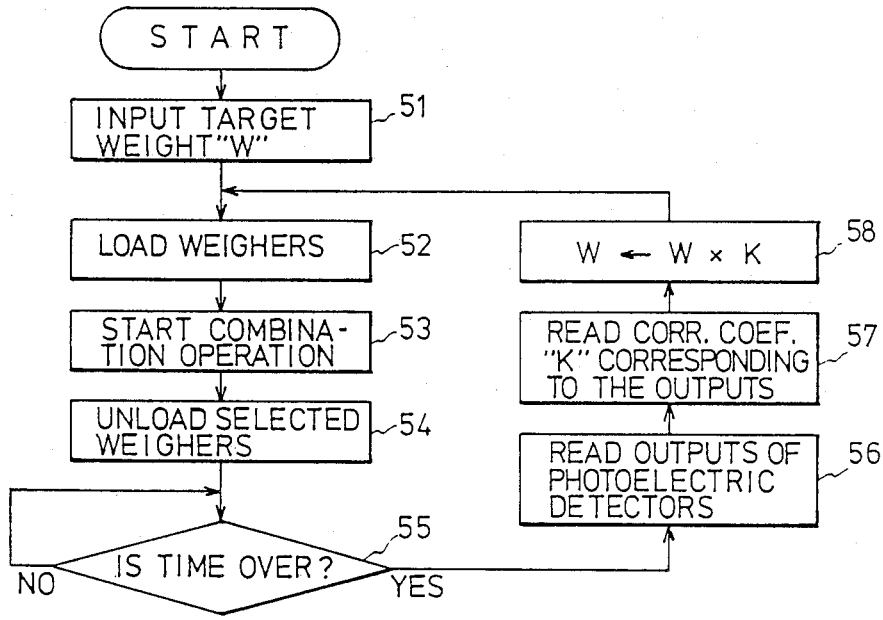
FIG. 5 is a flow chart representing an example of an operation program preferably used in the embodiment as shown in FIG. 4.

The components outlined in phantom in FIG. 4 can be substituted with a microcomputer including a random access (RAM) or read-only (ROM) memory serving as the correcton coefficient memory 42. FIG. 5 shows a flow chart of the program for effecting the abovementioned function by the microcomputer.

In this program, a predetermined initial target weight W is first set in step 51 and, then, empty (all initially) weighing hoppers are loaded with product in step 52, with the resultant weight signals entering the microcomputer. With these weight signals, a combination operation is initiated in step 53 and an optimum combination is selected. Those weighing hoppers belonging to the selected combination are unloaded in step 54 and, in the next step 55, it is inquired whether a predetermined time has passed after starting the unloading operation. The time is determined experimentally so as to be sufficient for all product discharged from the weighing hoppers to be collected completely in the retaining hopper 12. If "NO", this step 55 is repeated until "YES" is obtained. If "YES", the outputs of photoelectric detection probes 30a to 30e are read in the microcomputer in step 56 and a value of correction coefficient K corresponding to the format of these outputs is read out from the correction coefficient memory (RAM or ROM) in step 57. In the next or final step 58, the preset target weight W is multiplied by this coefficient K and the resultant product KW is substituted for the preceding target weight. Then, the operation is repeated similarly from step 52 for the next cycle.

It should be noted that the above description has been made only for illustration of the invention and various modification and changes can be made without departing from the scope of invention as claimed. For example, the detection probes 30 may be mechanical, ultrasonic or like other than photoelectric and the number of probes may be optional in accordance with desired accuracy of volume control. In addition, instead of controlling the target weight, the apparent density of product may be controlled for the same purpose by crushing the product to be fed to the weighing hoppers, as suggested in the opened Japanese patent specification Nos. 59-102122 and 59-102123.

I claim:

1. A combination weighing machine for delivering quantities of product measured by weight with each quantity having an allowable total weight, comprising:
   a set of separate devices for holding and unloading weighed batches of product, each batch having a weight constituting only a fraction of said allowable total weight;
   means for selecting a combination of batches having an allowable total weight;
   means for unloading the devices corresponding to said selected combination of batches;
   a retainer constituting part of said combination weighing machine located below said devices for receiving and retaining the selected combination of batches unloaded from corresponding devices, said retainer having an outlet adapted to open for discharge of said selected combination of batches from the combination weighing machine for delivery to a packaging machine or the like; and
   means for detecting the volume of said selected combination of batches retained in said retainer.

2. A combination weighing machine as set forth in claim 1 wherein said retainer and said devices for holding and unloading weighed batches of product are supported by framework of the combination weighing machine.

3. A combination weighing machine as set forth in claim 1 wherein said selecting means is adapted for selecting said combination of batches with reference to a target weight, said combination weighing machine further comprising means for changing said target weight in accordance with the detected volume in said retainer.

4. A combination weighing machine as set forth in claim 1 further comprising a collection chute below said devices for collecting said selected combination of batches and delivering them to said retainer, said collection chute having an open top constituting an inlet and an open bottom constituting an outlet, said retainer comprising a retaining hopper attached to the bottom of said chute.

5. A combination weighing machine as set forth in claim 4 wherein said selecting means is adapted for selecting said combination of batches with reference to a target weight, said combination weighing machine further comprising means for changing said target weight in accordance with the detected volume in said retainer.

6. A combination weighing machine for delivering quantities of product measured by weight to a packaging machine operable to package said quantities of product, each quantity of product having an allowable total weight, comprising:
- a set of separate devices for holding and unloading weighed batches of product, each batch having a weight constituting only a fraction of said allowable total weight;
- means for selecting a combination of batches having an allowable total weight;
- means for unloading the devices corresponding to said selected combination of batches;
- a retainer constituting part of said combination weighing machine located below said devices for receiving and retaining the selected combination of batches unloaded from corresponding devices, said retainer having an outlet adapted to open for discharge of said selected combination of batches from the combination weighing machine for delivery to said packaging machine; and
- means for detecting the volume of said selected combination of batches retained in said retainer.

7. A combination weighing machine as set forth in claim 6 wherein said retainer and said devices for holding and unloading weighed batches of product are supported by framework of the combination weighing machine.

8. A combination weighing machine as set forth in claim 6 wherein said selecting means is adapted for selecting said combination of batches with reference to a target weight, said combination weighing machine further comprising means for changing said target weight in accordance with the detected volume in said retainer.

9. A combination weighing machine as set forth in claim 6 further comprising a collection chute below said devices for collecting said selected combination of batches and delivering them to said retainer, said collection chute having an open top constituting an inlet and an open bottom constituting an outlet, said retainer comprising a retaining hopper attached to the bottom of said chute.

10. A combination weighing machine as set forth in claim 9 wherein said selecting means is adapted for selecting said combination of batches with reference to a target weight, said combination weighing machine further comprising means for changing said target weight in accordance with the detected volume in said retainer.

11. A method of making successive deliveries of quantities of product measured by weight with each quantity having an allowable total weight, utilizing a combination weighing machine comprising a set of devices adapted for holding and unloading weighed batches of product, each batch having a weight constituting only a fraction of said allowable total weight, said method comprising for each delivery a cycle of steps comprising:
- selecting a combination of batches having an allowable total weight;
- unloading the devices corresponding to the selected combination of batches;
- delivering the selected combination of batches unloaded from corresponding devices to a retainer constituting a part of said combination weighing machine located below said devices;
- detecting the volume of said selected combination of batches in the retainer;
- controlling the volume of those batches of product to be selected in the next delivery based on the result of said detecting step; and
- unloading the selected combination of batches in said retainer for delivery from the combination weighing machine to a packaging machine or the like.

12. A method as set forth in claim 11 wherein said selecting step is effected with reference to a predetermined target weight, and said target weight is controlled in accordance with the result of said detecting step.

* * * * *